United States Patent [19]
Min

[11] Patent Number: 5,706,121
[45] Date of Patent: Jan. 6, 1998

[54] LOW TEMPERATURE FORMED THIN FILM ACTUATED MIRROR ARRAY

[75] Inventor: Yong-Ki Min, Seoul, Rep. of Korea

[73] Assignee: Daewoo Electronics, Co., Ltd., Seoul, Rep. of Korea

[21] Appl. No.: 565,713

[22] Filed: Nov. 30, 1995

[30] Foreign Application Priority Data

Dec. 19, 1994 [KR] Rep. of Korea .................. 94-34972

[51] Int. Cl.$^6$ ........................................... G02B 26/00
[52] U.S. Cl. .................... 359/291; 359/224; 359/850
[58] Field of Search ............................ 359/290, 291, 359/295, 221, 224, 846, 850

[56] References Cited

U.S. PATENT DOCUMENTS

| | | | |
|---|---|---|---|
| 3,544,201 | 12/1970 | Fowler et al. | 350/285 |
| 4,615,595 | 10/1986 | Hornbeck | 353/122 |
| 4,793,699 | 12/1988 | Tokuhara | 350/487 |
| 5,085,497 | 2/1992 | Um et al. | 359/848 |
| 5,126,836 | 6/1992 | Um | 358/60 |
| 5,159,225 | 10/1992 | Um | 310/328 |
| 5,172,262 | 12/1992 | Hornbeck | 359/223 |
| 5,175,465 | 12/1992 | Um et al. | 310/328 |
| 5,185,660 | 2/1993 | Um | 358/60 |
| 5,247,222 | 9/1993 | Engle | 310/328 |
| 5,481,396 | 1/1996 | Ji et al. | 359/295 |

FOREIGN PATENT DOCUMENTS

| | | |
|---|---|---|
| 516 418 | 12/1992 | European Pat. Off. . |
| 652 455 | 5/1995 | European Pat. Off. . |
| 63-1176671 | 5/1988 | Japan . |
| 2 239 101 | 6/1991 | United Kingdom . |
| 2 258 055 | 1/1993 | United Kingdom . |
| 91/09503 | 9/1991 | WIPO . |

OTHER PUBLICATIONS

IEEE Transactions on Ultrasonics, Ferroelectronics and Frequency Control, "Very Large Deflection with Quadratic Voltage Dependence of ZnO on $Si_3N_4$ Bimorph", 39(2): 302–304 (1992).

*Primary Examiner*—David C. Nelms
*Assistant Examiner*—Dawn-Marie Bey
*Attorney, Agent, or Firm*—Pennie & Edmonds, LLP

[57] ABSTRACT

An array of M×N thin film actuated mirrors includes an active matrix having a substrate, an array of M×N connecting terminals and an array of M×N transistors, and an array of M×N actuating structures. Each of the actuating structures is of a bimorph structure and includes an actuating portion and a light reflecting portion, the actuating portion including a front portion of a second thin film electrode, a lower electrodisplacive member, an intermediate electrode, an upper electrodisplacive member, and a front portion of a first thin film electrode. The front portion of the second thin film electrode is electrically connected to each of the connecting terminals and each of the transistors, and the remaining portion of the first thin film electrode is placed on top of the remaining portion of the second thin film electrode to form the light reflecting portion, allowing the first and the second thin film electrodes to function as a signal electrode. The intermediate electrode placed between the upper and the lower electrodisplacive members functions as a common bias electrode.

15 Claims, 11 Drawing Sheets

LOW TEMPERATURE FORMED THIN FILM ACTUATED MIRROR ARRAY

FIELD OF THE INVENTION

The present invention relates to an optical projection system; and, more particularly, to an array of M×N thin film actuated mirrors, each of the thin film actuated mirrors being of a bimorph structure, for use in the system and a method for the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, thin film actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, M and N indicating the column and the row in the array 100, respectively, disclosed in a copending commonly owned application, U.S. Ser. No. 08/430,628, entitled "THIN FILM ACTUATED MIRROR ARRAY".

Figure 1A:
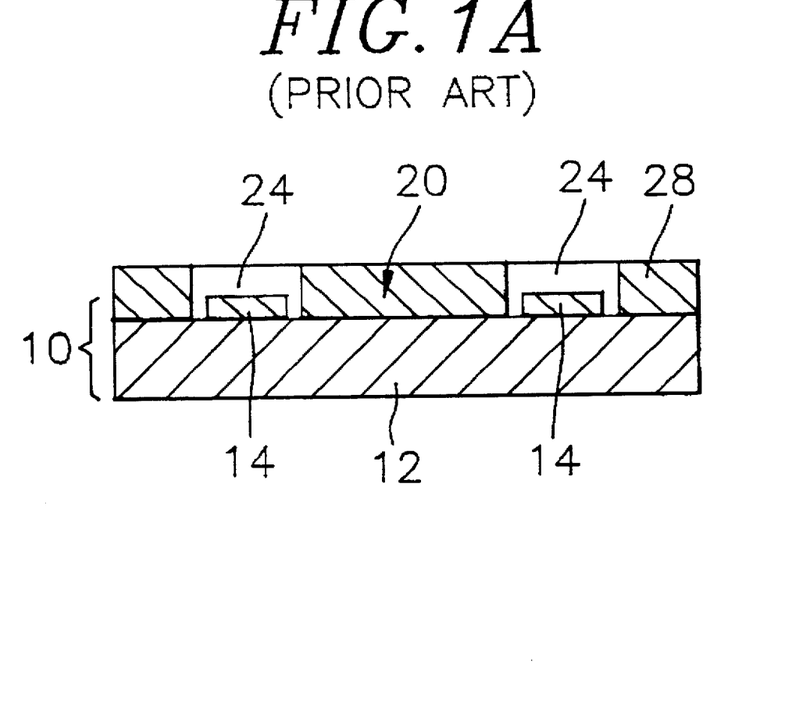
FIGS. 1A to 1G are schematic cross sectional views illustrating a method for the manufacture of an array of M×N thin film actuated mirrors previously disclosed.

The process for manufacturing the array 100 begins with the preparation of an active matrix 10 having a top surface, and comprising a substrate 12, an array of M×N transistors (not shown) and an array of M×N connecting terminals 14.

In a subsequent step, there is formed on the top surface of the active matrix 10 a thin film sacrificial layer 28 by using a sputtering or an evaporation method if the thin film sacrificial layer 28 is made of a metal, a chemical vapor deposition(CVD) or a spin coating method if the thin film sacrificial layer 28 is made of a phosphor-silicate glass (PSG), or a CVD method if the thin film sacrificial layer 28 is made of a poly-Si.

Thereafter, there is formed a supporting layer 20 including an array of M×N supporting members 24 surrounded by the thin film sacrificial layer 28, wherein the supporting layer 20 is formed by: creating an array of M×N empty slots(not shown) on the thin film sacrificial layer 28 by using a photolithography method, each of the empty slots being located around the connecting terminals 14; and forming a supporting member 24 in each of the empty slots located around the connecting terminals 14 by using a sputtering or a CVD method, as shown in FIG. 1A. The supporting members 24 are made of an insulating material.

Figure 1B:
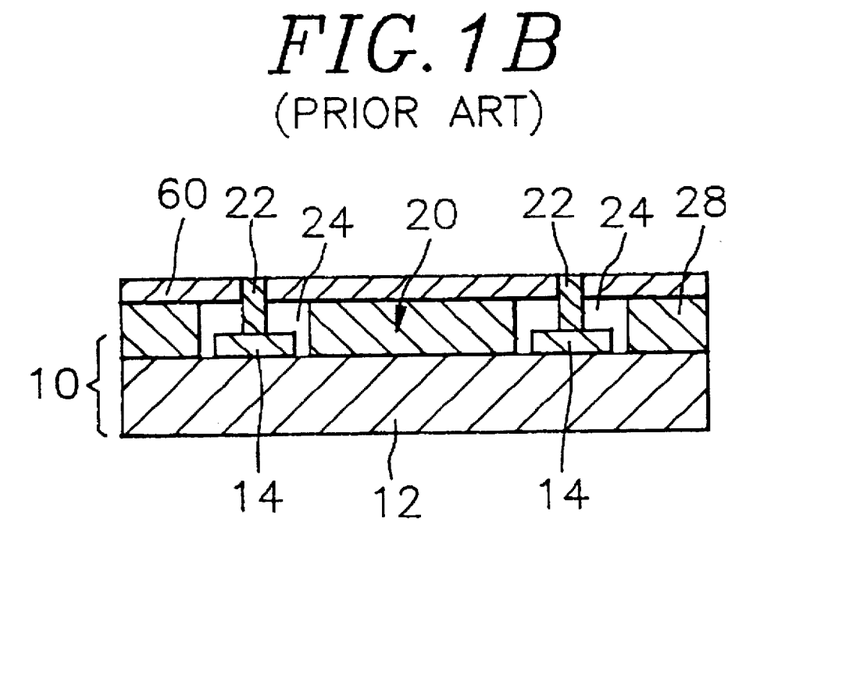

In a following step, an elastic layer 60 made of the same material as the supporting members 24 is formed on top of the supporting layer 20 by using a Sol-Gel, a sputtering or a CVD method.

Subsequently, a conduit 22 made of a metal is formed in each of the supporting members 24 by: first creating an array of M×N holes(not shown), each of the holes extending from top of the elastic layer 60 to top of the connecting terminals 14, by using an etching method; and filling therein with the metal to thereby form the conduit 22, as shown in FIG. 1B.

Figure 1C:
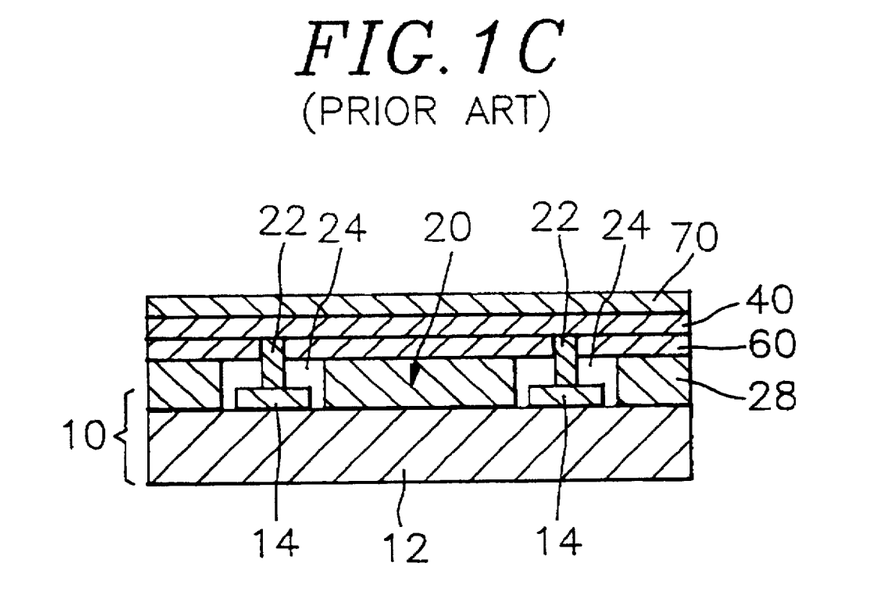

In a next step, a second thin film layer 40 made of an electrically conducting material is formed on top of the elastic layer 60 including the conduits 22 by using a sputtering method. The second thin film layer 40 is electrically connected to the transistors through the conduits 22 formed in the supporting members 24.

Then, a thin film electrodisplacive layer 70 made of a piezoelectric material, e.g., lead zirconium titanate(PZT), is formed on top of the second thin film layer 40 by using a sputtering method, a CVD method or a Sol-Gel method, as shown in FIG. 1C.

Figure 1D:
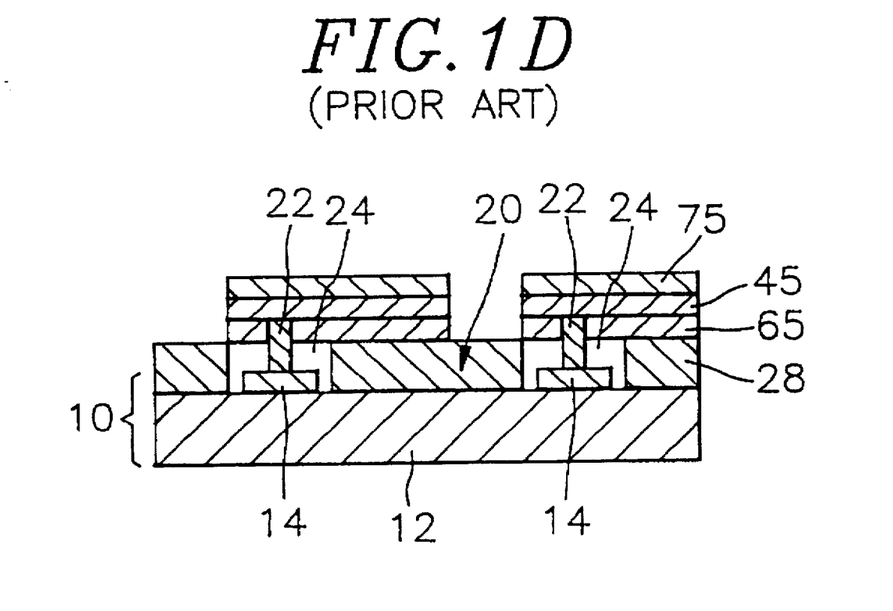

In an ensuing step, the thin film electrodisplacive layer 70, the second thin film layer 40 and the elastic layer 60 are patterned into an array of M×N thin film electrodisplacive members 75, an array of M×N second thin film electrodes 45 and an array of M×N elastic members 65 by using a photolithography or a laser trimming method until the supporting layer 20 is exposed, as shown in FIG. 1D. Each of the second thin film electrodes 45 is connected electrically to the transistor through the conduit 22 formed in each of the supporting members 24 and functions as a signal electrode in the thin film actuated mirrors 101.

Next, each of the thin film electrodisplacive members 75 is heat treated at a high temperature, e.g., around 650° C. in case of PZT, to allow a phase transition to take place to thereby form an array of M×N heat treated structures(not shown). Since each of the thin film electrodisplacive members 75 is sufficiently thin, there is no need to pole it in case it is made of a piezoelectric material: for it can be poled with the electric signal applied during the operation of the thin film actuated mirrors 101.

Figure 1E:
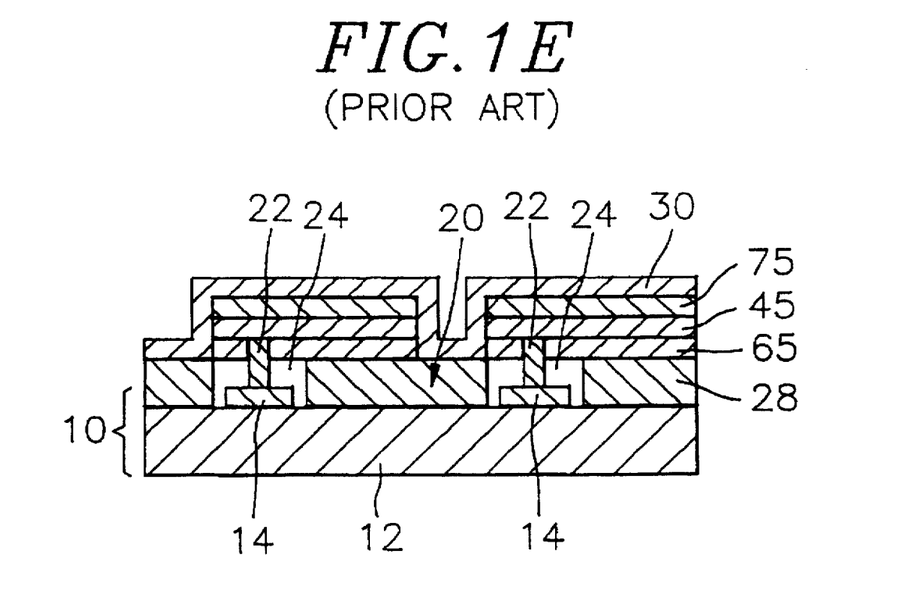
Figure 1F:
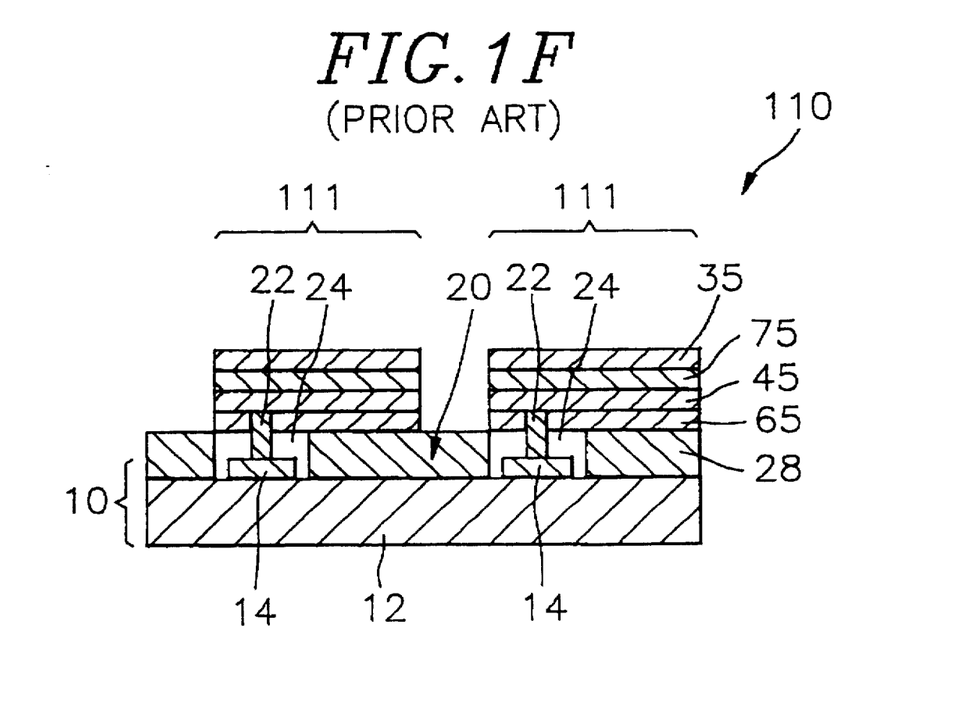

After the above step, an array of M×N first thin film electrodes 35 made of an electrically conducting and light reflecting material is formed on top of the thin film electrodisplacive members 75 in the array of M×N heat treated structures by first forming a layer 30, made of the electrically conducting and light reflecting material, completely covering top of the array of M×N heat treated structures, including the exposed supporting layer 20, using a sputtering method, as shown in FIG. 1E, and then selectively removing the layer 30, using an etching method, resulting in an array 110 of M×N actuated mirror structures 111, wherein each of the actuated mirror structures 111 includes a top surface and four side surfaces, as shown in FIG. 1F. Each of the first thin film electrodes 35 functions as a mirror as well as a bias electrode in the thin film actuated mirrors 101.

The preceeding step is then followed by completely covering the top surface and the four side surfaces in each of the actuated mirror structures 111 with a thin film protection layer(not shown).

Figure 1G:
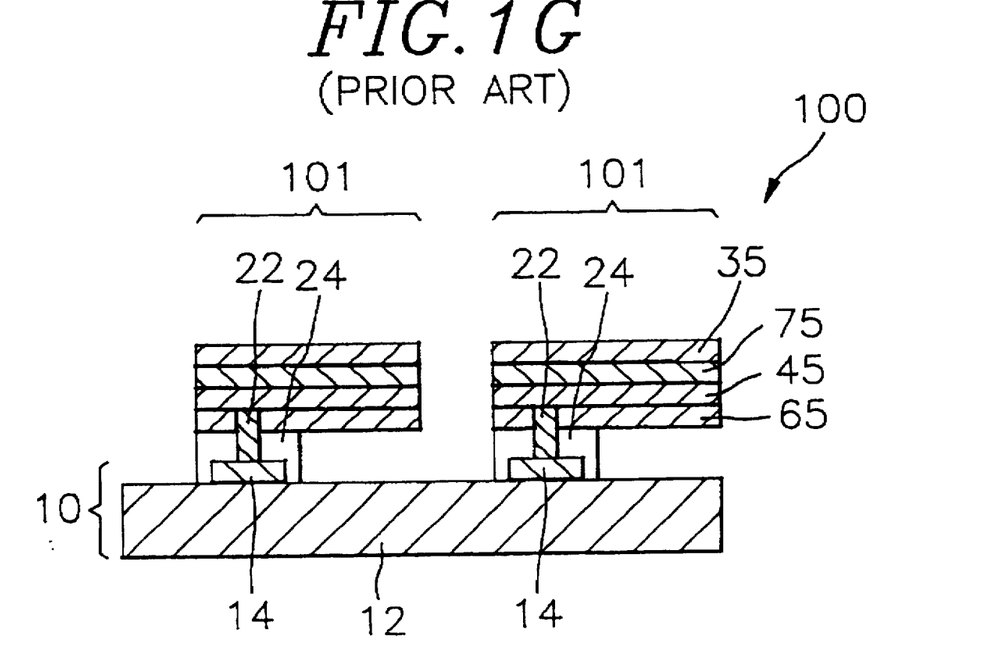

The thin film sacrificial layer 28 in the supporting layer 20 is then removed by using an etching method. Finally, the thin film protection layer is removed to thereby form the array 100 of M×N thin film actuated mirrors 101, as shown in FIG. 1G.

There are certain deficiencies associated with the above described method for manufacturing the array 100 of M×N thin film actuated mirrors 101. The formation of the thin film electrodisplacive members 75 involves a high temperature, and therefore, care should be taken in selecting a proper material for the thin film sacrificial layer 28 capable of withstanding the high temperature required in the formation thereof.

In addition, since the method for the manufacture of the array 100 involves the high temperature process, the electrode materials used must be also able to withstand the high temperature, and such electrode materials are usually expensive, which will, in turn, increase the manufacturing cost of the array 100.

Furthermore, the high temperature required during the formation of the thin film electrodisplacive members 75 may adversely affect the structural integrity of each of the thin film actuated mirrors 101 which may compromise the overall performance of the array 100.

In addition to the above described deficiencies in the method for manufacturing thereof, the array 100 thus prepared has a major shortcoming, the shortcoming being the overall optical efficiency. When each of the thin film actuated mirrors 101 deforms in response to an electric field applied across the thin film electrodisplacive member 75 thereof, the first thin film electrode 35 attached thereto, which also acts as a mirror, also deforms to thereby, instead of creating a planar top surface, create a curved top surface from which the light beams are reflected. As a result, the overall optical efficiency of the array 100 decreases.

SUMMARY OF THE INVENTION

It is, therefore, a primary object of the present invention to provide a method for the manufacture of an array of M×N thin film actuated mirrors for use in an optical projection system, the method being free of the high temperature process, thereby making it possible to employ a less expensive material selected from a variety of materials for the thin film sacrificial layer and the electrodes.

It is another object of the present invention to provide an array of M×N thin film actuated mirrors for use in an optical projection system, which will allow the removal of the high temperature process during the manufacture thereof.

It is still another object of the present invention to provide an array of M×N thin film actuated mirrors for use in an optical projection system having an improved optical efficiency.

In accordance with one aspect of the present invention, there is provided a method for the manufacture of an array of M×N thin film actuated mirrors, wherein M and N are integers and each of the thin film actuated mirrors includes a light reflecting portion and an actuating portion, for use in an optical projection system, the method comprising the steps of: providing an active matrix having a top surface, the active matrix including a substrate with an array of M×N transistors and an array of M×N connecting terminals; forming a thin film sacrificial layer on the top surface of the active matrix; removing portions of the thin film sacrificial layer formed around top of each of the connecting terminals in the active matrix; forming a second thin film electrode layer on top of the thin film sacrificial layer and the top surface of the active matrix; depositing a lower electrodisplacive layer on top of the second thin film electrode layer, wherein the lower electrodisplacive layer is made of a material characterized in that it is crystallographically asymmetric, exhibits no hysteresis, and is formed at a temperature ranging from 200° C. to 300° C.; forming an intermediate electrode layer on top of the lower electrodisplacive layer; patterning the intermediate electrode layer in a columnar direction to produce M number of patterned intermediate electrode layers, wherein each of the patterned intermediate electrode layers is disconnected from each other and covers a portion of the lower electrodisplacive layer in such a way that said portion encompasses the connecting terminals in a same column; depositing an upper electrodisplacive layer, made of the same material as the lower electrodisplacive layer, on top of the lower electrodisplacive layer with the patterned intermediate electrode layers located therebetween; patterning the upper and the lower electrodisplacive layers in the columnar direction until the second thin film electrode layer is exposed to produce a patterned structure including M number of patterned layers and a corresponding number of exposed second thin film electrode layers to thereby define the actuating portion and the light reflecting portion in each of the thin film actuated mirrors, wherein each of the patterned layers corresponds to the actuating portion in each of the thin film actuated mirrors, is disconnected from each other by one of the exposed second thin film electrode layers and encompasses each of the patterned intermediate electrode layers, and each of the exposed second thin film electrode layers corresponds to the light reflecting portion in each of the thin film actuated mirrors; forming a first thin film electrode layer made of an electrically conducting and light reflecting material on top of the patterned structure to produce a semifinished actuated structure; patterning the semifinished actuated structure in a row direction, until the thin film sacrificial layer is exposed, into an array of M×N semifinished actuated mirrors, wherein each of the semifinished actuated mirrors includes a first thin film electrode, an upper electrodisplacive member, an intermediate electrode, a lower electrodisplacive member and a second thin film electrode; and removing the thin film sacrificial layer to thereby form an array of M×N thin film actuated mirrors.

In accordance with another aspect of the present invention, there is provided an array of M×N thin film actuated mirrors, wherein M and N are integers, for use in an optical projection system, the array comprising: an active matrix, having a top surface and including a substrate with an array of M×N connecting terminals and an array of M×N transistors; and an array of M×N actuating structures, each of the actuating structures being of a bimorph structure, each of the actuating structures having an actuating and a light reflecting portions, the actuating portion in each of the actuating structures including a front portion of a first thin film electrode, an upper electrodisplacive member, an intermediate electrode, a lower electrodisplacive member and a front portion of a second thin film electrode, the light reflecting portion including the remaining portion of the first thin film electrode and the remaining portion of the second thin film electrode, the electrodisplacive members being made of a material characterized in that it is crystallographically asymmetric, exhibits no hysteresis, and is formed at a temperature ranging from 200° C. to 300° C., wherein bottom of the front portion of the second thin film electrode is electrically connected to each of the connecting terminals and each of the transistors to thereby allow the second thin film electrode to function as a signal electrode, the lower electrodisplacive member is placed on top of the front portion of the second thin film electrode, the intermediate electrode is formed on top of the lower electrodisplacive member and functions as a common bias electrode, the upper electrodisplacive member is placed on top of the lower electrodisplacive member with the intermediate electrode located therebetween, and the first thin film electrode made of a light reflecting and electrically conducting material is placed on top of the upper electrodisplacive member and the remaining portion of the second thin film electrode in the light reflecting portion, thereby connecting electrically the first thin film electrode with the second thin film electrode, allowing the first thin film electrode to function as a mirror and the signal electrode in each of the actuating structures.

BRIEF DESCRIPTION OF THE DRAWINGS

The above and other objects and features of the present invention will become apparent from the following description of the preferred embodiments given in conjunction with the accompanying drawings, wherein.

DETAILED DESCRIPTION OF THE PREFERRED EMBODIMENTS

Figure 2:
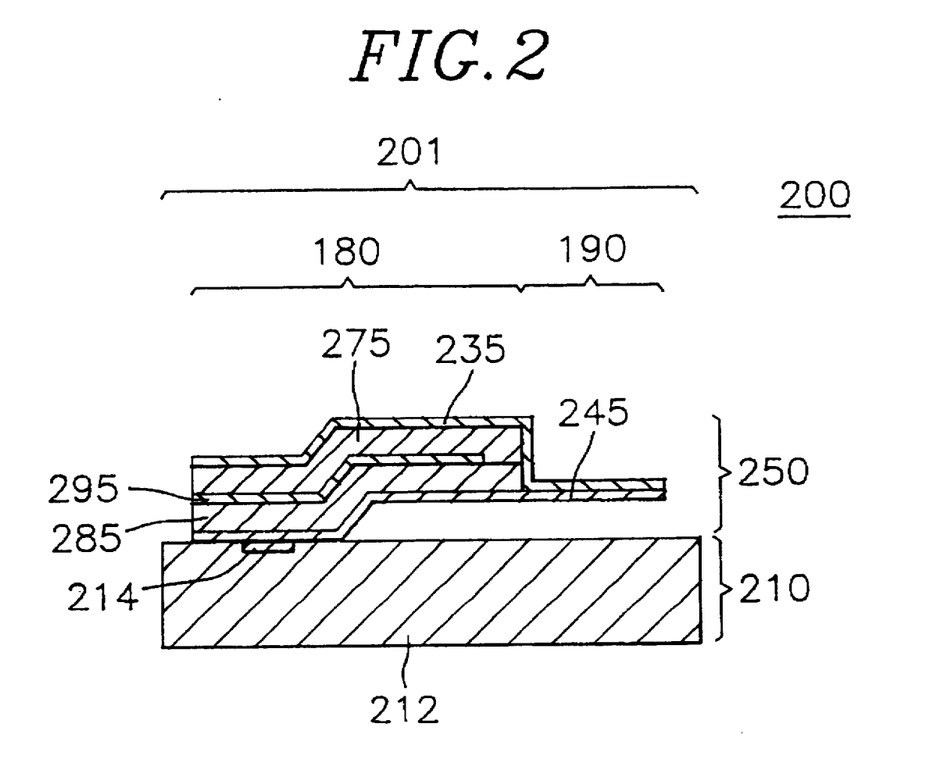
FIG. 2 is a cross sectional view of an array of M×N thin film actuated mirrors in accordance with one embodiment of the present invention.

There are provided in FIGS. 2 and 5 a cross sectional view of an inventive array 200, 400 of M×N thin film actuated mirrors 201, 401, wherein M and N are integers, M and N indicating the column and the row in the array 200, 400, respectively, for use in an optical projection system and schematic cross sectional views setting forth a method for the manufacture thereof, respectively. It should be noted that like parts appearing in FIGS. 2 and 5 are represented by like reference numerals.

In FIG. 2, there is provided a cross sectional view of the inventive array 200 of M×N thin film actuated mirrors 201, the array 200 comprising an active matrix 210 and an array of M×N actuating structures 250, wherein each of the actuating structures 250 has a bimorph structure.

The active matrix 210 includes a substrate 212 with an array of M×N connecting terminals 214 and an array of M×N transistors(not shown), wherein each of the connecting terminals 214 is electrically connected to the transistors.

Each of the actuating structures 250 is provided with an actuating and a light reflecting portions 180, 190. The actuating portion 180 in each of the actuating structures 250 includes a front portion of a second thin film electrode 245, a lower electrodisplacive member 285, an intermediate electrode 295, an upper electrodisplacive member 275 and a front portion of a first thin film electrode 235; and the light reflecting portion 190 is formed by the remaining portions of the first and the second thin film electrodes 235, 245 placed on top of another. Bottom of the front portion of the second thin film electrode 245 in the actuating portion 180 in each of the actuating structures 250 is attached to the top surface of the active matrix 210 in such a way that it is electrically connected to each of the connecting terminals 214 which, in turn, is connected electrically to each of the transistors, thereby allowing the second thin film electrode 245 to function as a signal electrode in each of the actuating structures 250. The lower electrodisplacive member 285 is placed on top of the front portion of the second thin film electrode 245. The intermediate electrode 295 is placed between the upper and the lower electrodisplacive members 275, 285, and functions as a common bias electrode in each of the actuating structures 250. The upper electrodisplacive member 275 is placed on top of the lower electrodisplacive member 285 with the intermediate electrode 295 located therebetween. The first thin film electrode 235 made of an electrically conducting and light reflecting material is placed on top of the upper electrodisplacive member 275 and on top of the remaining portion of the second thin film electrode 245 of the light reflecting portion 190, connecting electrically the first thin film electrode 235 with the second thin film electrode 245 to thereby allow the first thin film electrode 235 to function as a mirror as well as the signal electrode in each of the actuating structures 250.

The upper and the lower electrodisplacive members 275, 285 in each of the thin film actuated mirrors 201 are made of a crystallographically asymmetric material, e.g., zinc oxide(ZnO) or aluminum nitride(AlN), the material further being characterized in that: it exhibits no hysteresis loop; and it can be formed at a temperature ranging from 200° C. to 300° C. The use of such a material for the upper and the lower electrodisplacive members 275, 285, in turn, allows the use of low melting and cheaper electrode materials, such as aluminum(Al) or silver(Ag), in the first, the second, and the intermediate thin film electrodes 235, 245, 295, thereby reducing the overall manufacturing cost of the array 200.

The polarization direction of the upper electrodisplacive member 275 is identical to that of the lower electrodisplacive member 285. When an electric field is applied across the upper and the lower electrodisplacive members 275, 285 in each of the thin film actuated mirrors 201, the polarization direction in one of the electrodisplacive members coincides with the electric field and that of the other electrodisplacive member is opposite from the electric field. In such an event, the electrodisplacive member whose polarization direction coincides with the electric field will expand vertically and contract horizontally, and the electrodisplacive member whose polarization direction is opposite from the electric field will contract vertically and expand horizontally, thereby giving rise to a bimorph mode of operation. Further, as the first and the second thin film electrodes 235, 245 are joined together form to form the light reflecting portion 190 in each of the thin film actuated mirrors 201, and the light reflecting portion 190 in each of the actuating structures 250 stays planer when the electric signal is applied to the thin film actuated mirrors 201, allowing thereof to be fully utilized for reflecting the light beam, thereby improving the optical efficiency of each of the thin film actuated mirrors 201.

In FIGS. 3A to 3G, there are provided schematic cross sectional views setting forth a method for the manufacture of the inventive array 200 of M×N thin film actuated mirrors 201.

Figure 3A:
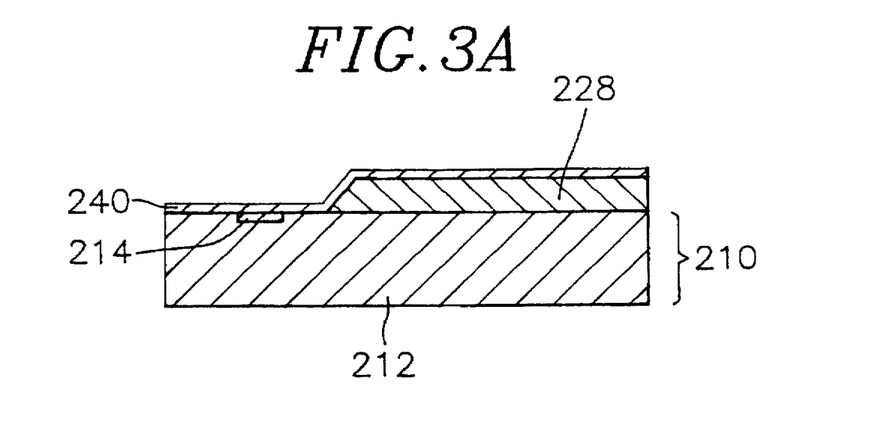
FIGS. 3A to 3G are schematic cross sectional views setting forth a method for the manufacture of the inventive array of M×N thin film actuated mirrors shown in FIG. 2.

The process for manufacturing the array 200 begins with the preparation of an active matrix 210, having a top surface and including a substrate 212 with an array of M×N connecting terminals 214 and an array of M×N transistors(not shown), wherein the substrate 212 is made of an insulating material, e.g., Si-wafer.

In a subsequent step, a thin film sacrificial layer 228, made of an oxide, e.g., ZnO, or a polymer, e.g., a polyimide, and having a thickness of 1-2 μm, is formed on top of the active matrix 210 by using a sputtering or a vacuum evaporation method if the thin film sacrificial layer 228 is made of an oxide, or a spin coating method if the thin film sacrificial layer 228 is made of a polymer.

Thereafter, portions of the thin film sacrificial layer 228 formed around top of each of the connecting terminals 214 in the active matrix 210 are removed, thereby exposing thereof by using a photolithography method.

Subsequently, a second thin film electrode layer 240, made of a first electrically conducting material, e.g., aluminum(Al) or silver(Ag), and having a thickness of 0.1-2 µm, is formed on top of the thin film sacrificial layer 228 and the exposed top surface of the active matrix 210 by using a sputtering or a vacuum evaporation method such that the second thin film electrode layer 240 is electrically connected to the connecting terminals 214, as shown in FIG. 3A.

Figure 3B:
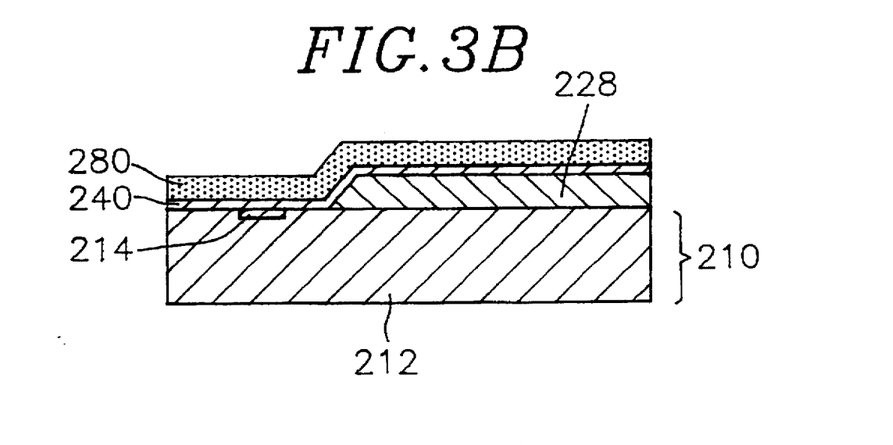

As shown in FIG. 3B, a lower electrodisplacive layer 280, made of a crystallographically asymmetric, low temperature forming material, e.g., ZnO, and having a thickness of 0.1-2 µm, is formed on top of the second thin film electrode layer 240 by using an evaporation method or a sputtering method.

In a following step, an intermediate electrode layer(not shown), made of a second electrically conducting material, e.g., Al or Ag, and having a thickness of 0.1-2 µm, is deposited on top of the lower electrodisplacive layer 280 by using a sputtering or a vacuum evaporation method. The second thin film electrode layer 240 and the intermediate electrode layer can be made of the same electrically conducting material.

Figure 3C:
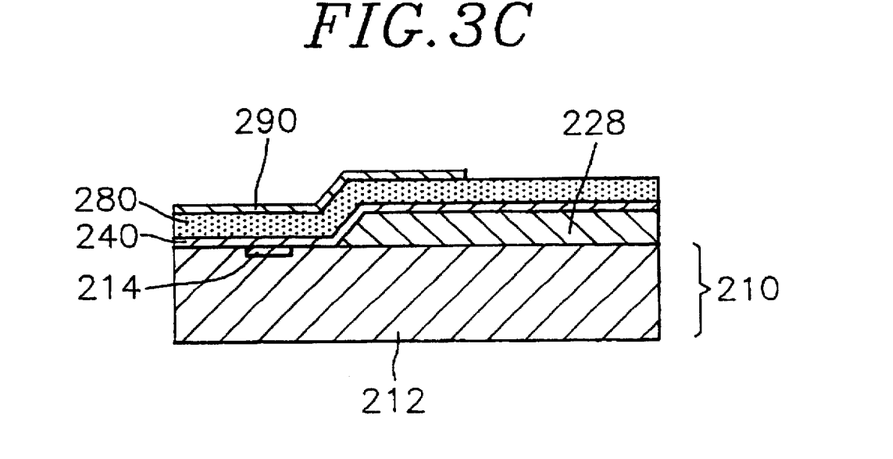

Then, the intermediate electrode layer is patterned in the columnar direction to produce M number of patterned intermediate electrode layers 290, as shown in FIG. 3C, by using a photolithography or a laser trimming method, wherein each of the patterned intermediate electrode layers 290 is disconnected from each other and covers a portion of the lower electrodisplacive layer 280 in such a way that the portion covered by each of the patterned intermediate electrode layers 290 encompasses the connecting terminals 214 in the same column when the portion is projected downward.

Figure 3D:
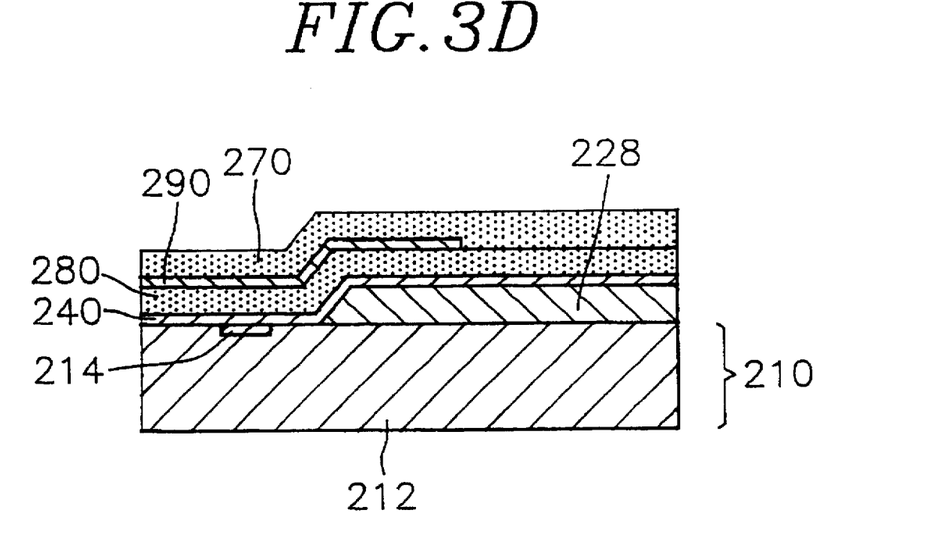

In a next step, as shown in FIG. 3D, an upper electrodisplacive layer 270, made of the same material and having the same thickness as the lower electrodisplacive layer 280, is formed on top of the patterned intermediate electrode layers 290 and the lower electrodisplacive layer 280 by using an evaporation or a sputtering method.

Figure 3E:
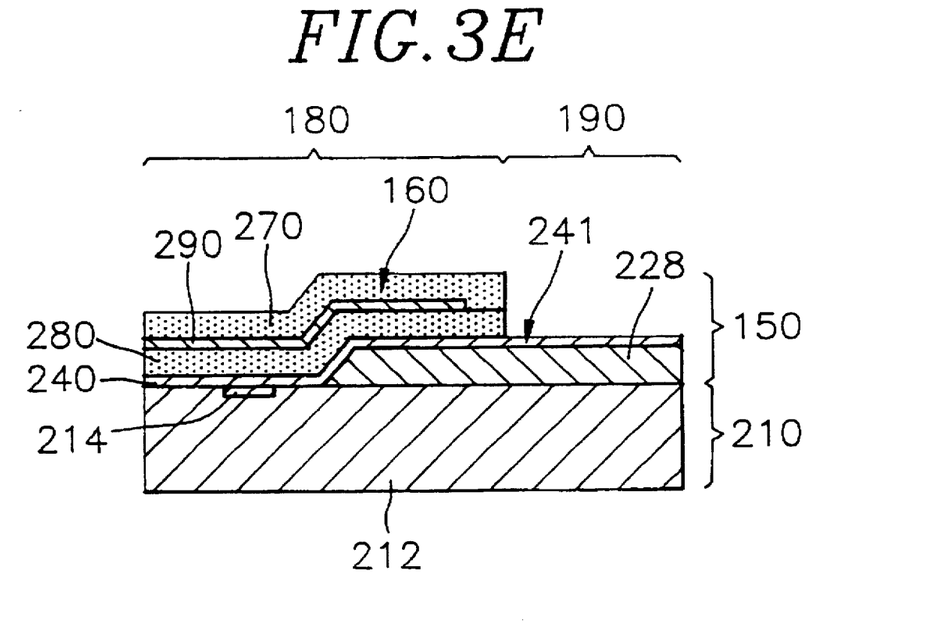

In an ensuing step, the upper and the lower electrodisplacive layers 270, 280 are patterned in the columnar direction until the second thin film electrode layer 240 is exposed by using a photolithography or a laser trimming method to produce a patterned structure 150 including M number of patterned layers 160 and a corresponding number of exposed second thin film electrode layers 241, wherein each of the patterned layers 160 is separated from each other by one of the exposed second thin film electrode layers 241 and encompasses each of the patterned intermediate electrode layers 290, as shown in FIG. 3E. This step gives rise to the actuating portion 180 and the light reflecting portion 190 in each of the thin film actuated mirrors 201 with the actuating portion 180 corresponding to the patterned layer 160, and the light reflecting portion 190 corresponding to the exposed second thin film electrode layer 241.

Figure 3F:
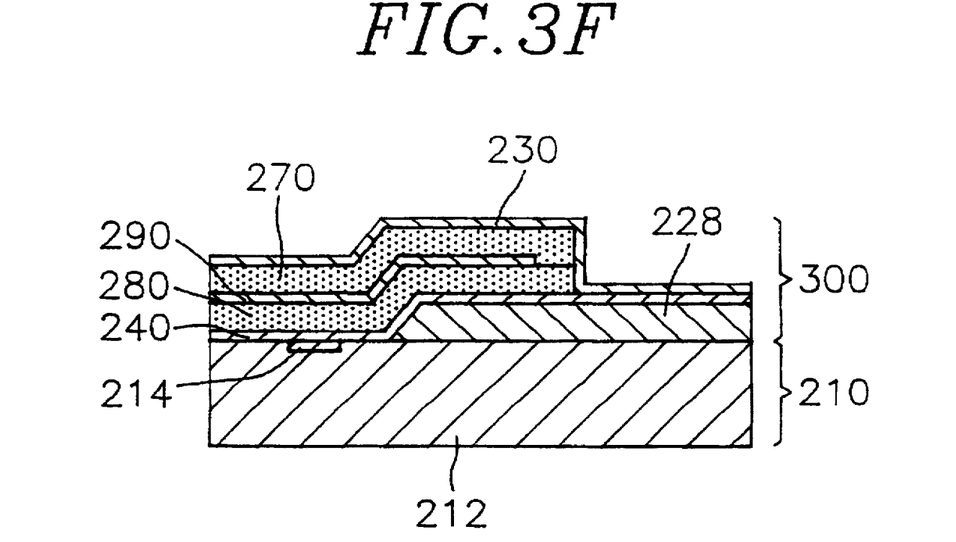

Next, a first thin film electrode layer 230, made of an electrically conducting and light reflecting material, e.g., Al or Ag, and having a thickness of 500-2000 Å, is formed on the patterned structure 150 by using a sputtering or a vacuum evaporation method to thereby produce a semifinished actuated structure 300, as shown in FIG. 3F.

After the above step, the semifinished actuated structure 300 is patterned in a row direction, until the thin film sacrificial layer 228 is exposed, into an array of M×N semifinished actuated mirrors(not shown), each of the semifinished actuated mirrors including a first thin film electrode 235, an upper electrodisplacive member 275, an intermediate electrode 295, a lower electrodisplacive member 285 and a second thin film electrode 245 by using a photolithography or a laser trimming method. In each of the semifinished actuated mirrors, the first thin film electrode 235 is connected to the second thin film electrode 245 at the light reflecting portion 190 which, in turn, is electrically connected to the connecting terminal 214 and the transistor, thereby allowing the first and the second thin film electrodes 235, 245 to function as a signal electrode in the thin film actuated mirror 201.

Figure 3G:
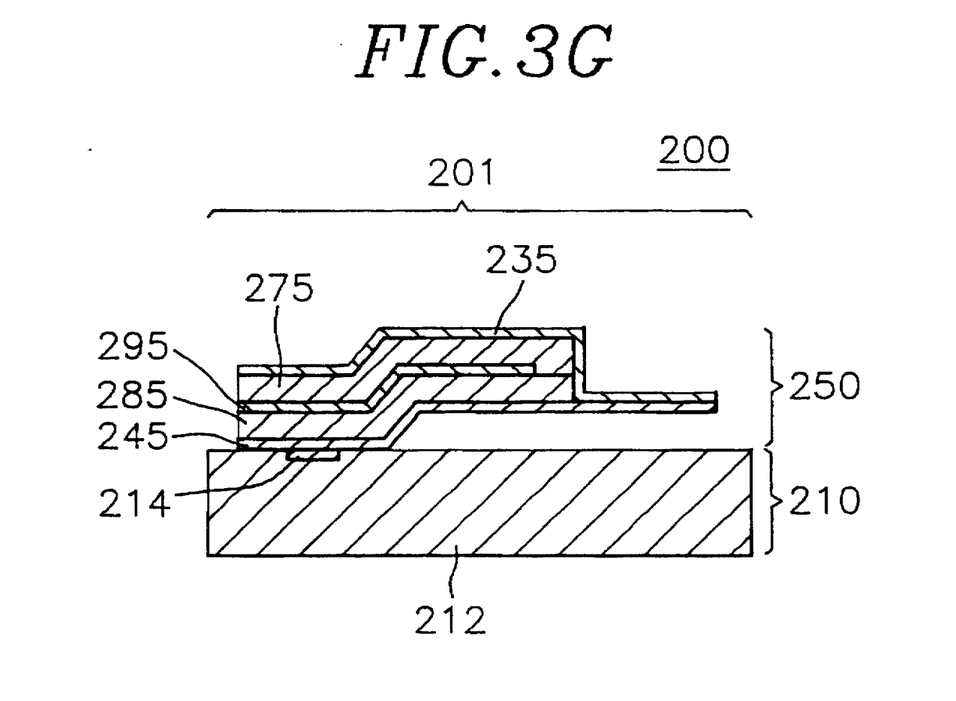

Finally, the thin film sacrificial layer 228 is then removed by using an etching method to thereby form the array 200 of M×N thin film actuated mirrors 201, as shown in FIG. 3G.

Figure 4:
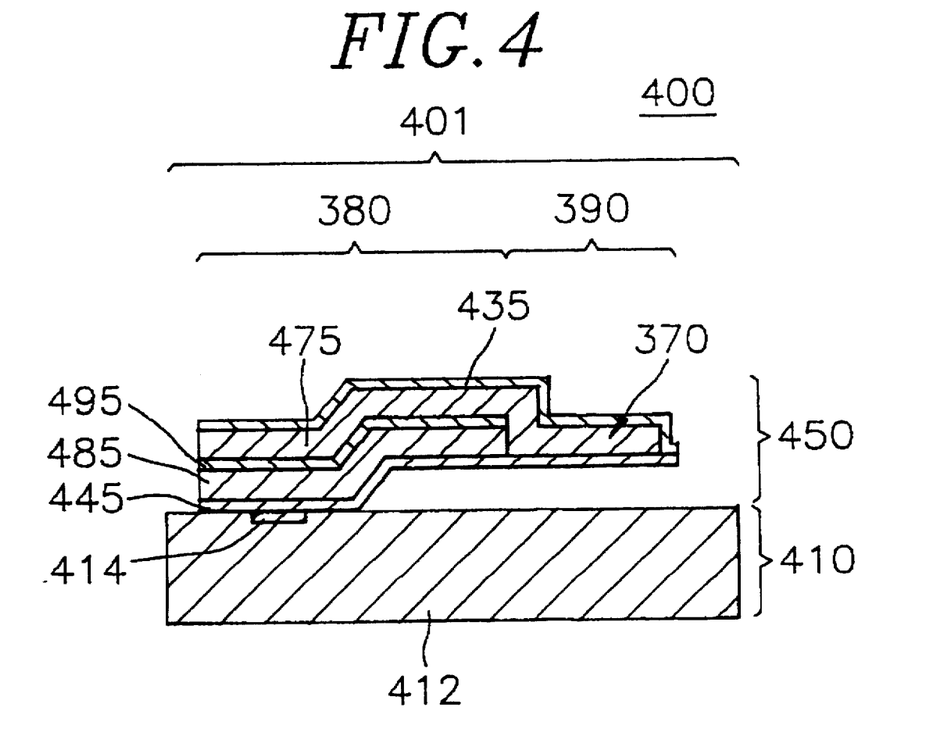
FIG. 4 is a cross sectional view of an array of M×N thin film actuated mirrors in accordance with another embodiment of the present invention.

In FIG. 4, there is provided a cross sectional view of an array 400 of M×N thin film actuated mirrors 401 in accordance with another embodiment of the present invention, wherein each of the thin film actuated mirrors 401 includes an actuating portion 380 and a light reflecting portion 390. The array 400 is similar to the array 200 shown in FIG. 2 except that the first and the second thin film electrodes 435, 445 in the light reflecting portion 390 in each of the thin film actuated mirrors 401 are separated by a layer 370 of an electrodisplacive material, the layer 370 providing an additional support for enhancing the structural integrity of the light reflecting portion 390 thereof.

In FIGS. 5A to 5D, there are provided schematic cross sectional views setting forth a method for the manufacture of the array 400 of M×N thin film actuated mirrors 401.

Figure 5A:
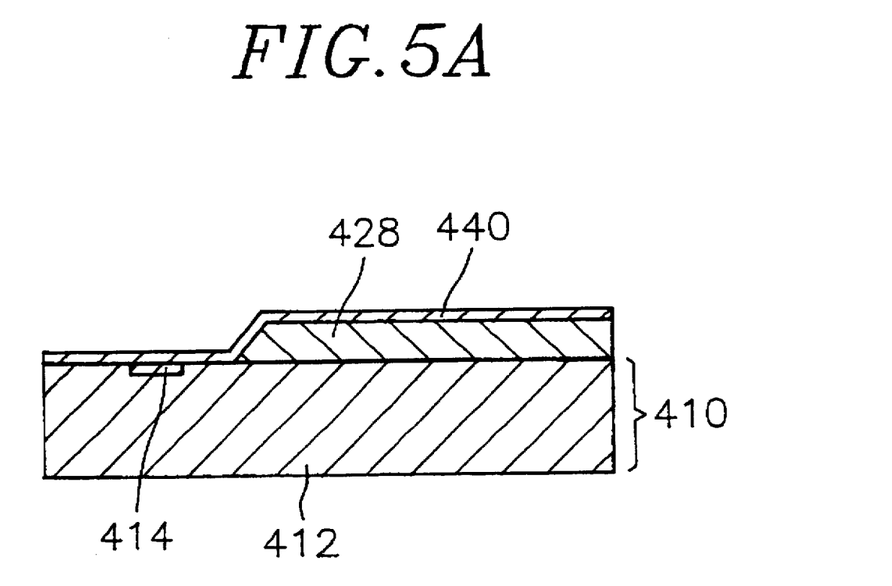
FIGS. 5A to 5D are schematic cross sectional views setting forth a method for the manufacture of the array of M×N thin film actuated mirrors shown in FIG. 4.
Figure 5B:
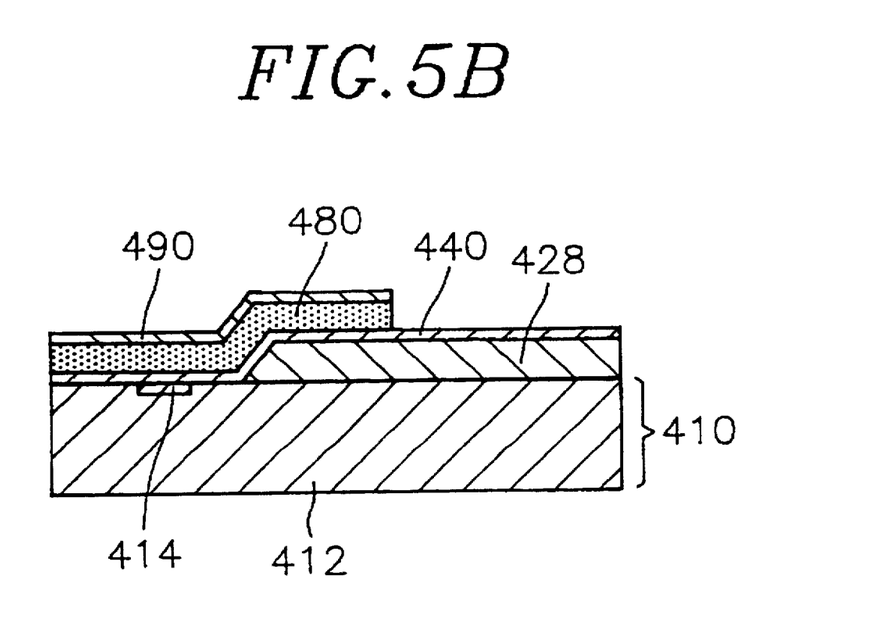
Figure 5C:
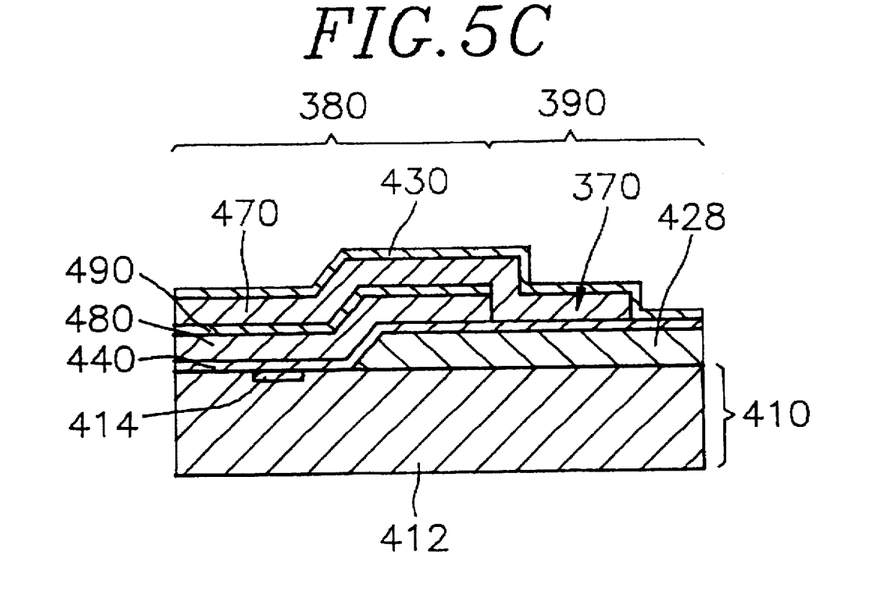
Figure 5D:
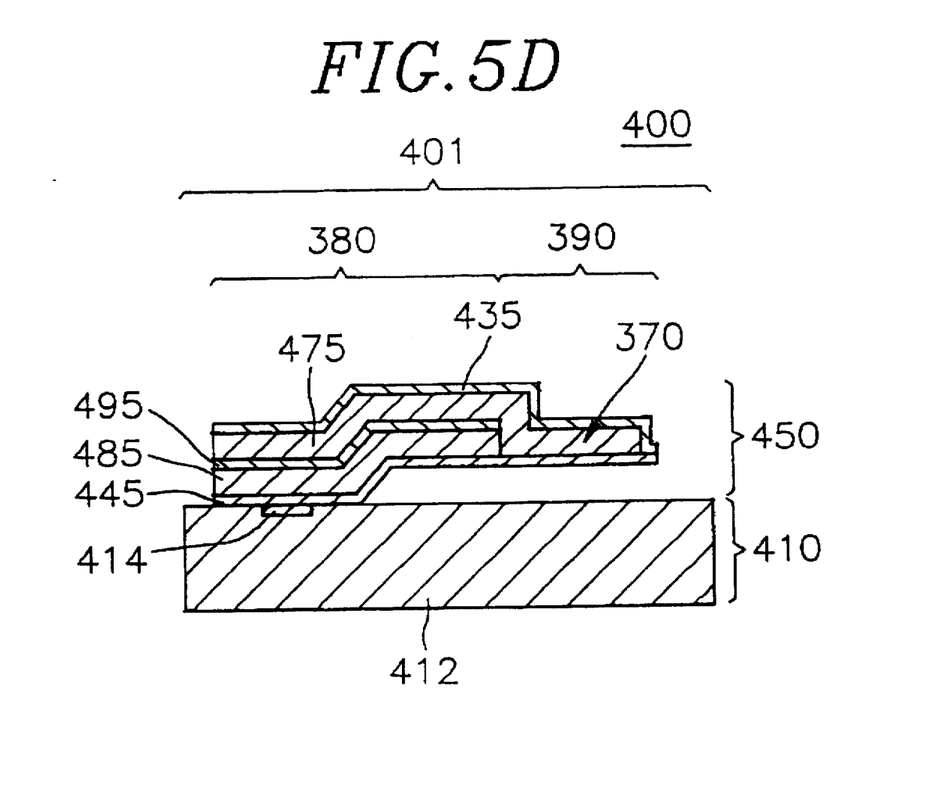

The process for manufacturing the array 400 is similar to that of the array 200 shown in FIG. 2 except that the upper and the lower electrodisplacive layers 470, 480 are patterned by using a photolithography or a laser trimming method in such a way that a layer 370 of the electrodisplacive material is left on top of the second thin film electrode layer 440 in the light reflecting portion 390, as illustrated in FIG. 5C.

In the above described arrays 200, 400 and the methods for the manufacture thereof, as the upper and the lower electrodisplacive members of each of the thin film actuated mirrors 201, 401 are made of a crystallographically asymmetric material, e.g., ZnO, that can be formed at a relatively low temperature, e.g., 200-300° C., the high temperature process can be dispensed with during the formation thereof, thereby making it possible to select a material to be used for the thin film sacrificial layer from a wider range of materials.

In addition, the use of, e.g., ZnO or a material having similar properties for the upper and the lower electrodisplacive members allows the use of low melting and hence cheaper electrode materials, in the first, the second, and the intermediate thin film electrodes, thereby reducing the overall manufacturing cost of the array.

Furthermore, since the array is formed without using the high temperature process, the structural integrity, and hence the performance thereof, can be better preserved.

While the present invention has been described with respect to certain preferred embodiments only, other modifications and variations may be made without departing from the scope of the present invention as set forth in the following claims.

What is claim is:

1. An array of M×N thin film actuated mirrors, wherein M and N are integers, M and N indicating a column and a row in the array, respectively, for use in an optical projection system, the array comprising:

an active matrix with an array of M×N connecting terminals; and an array of M×N actuating structures, each of the actuating structures being of a bimorph structure, each of the actuating structures having an actuating and a light reflecting portions, the actuating portion in each of the actuating structures including a front portion of a first thin film electrode, an upper electrodisplacive member, an intermediate electrode, a lower electrodisplacive member and a front portion of a second thin film electrode, the light reflecting portion including the remaining portion of the first thin film electrode and the remaining portion of the second thin film electrode, wherein the bottom of the front portion of the second thin film electrode is electrically connected to each of the connecting terminals to thereby allow the second thin film electrode to function as a signal electrode, the lower electrodisplacive member is placed on top of the front portion of the second thin film electrode, the intermediate electrode is formed on top of the lower electrodisplacive member and functions as a common bias electrode, the upper electrodisplacive member is placed on top of the lower electrodisplacive member with the intermediate electrode located therebetween, and the first thin film electrode made of a light reflecting and electrically conducting material is placed on top of the upper electrodisplacive member and the remaining portion of the second thin film electrode in the light reflecting portion, thereby connecting electrically the first thin film electrode with the second thin film electrode, allowing the first thin film electrode to function as a mirror and the signal electrode in each of the actuating structures.

2. The array of claim 1, wherein the first and the second thin film electrodes in the light reflecting portion are separated by a layer of an electrodisplacive material.

3. The array of claim 2, wherein the electrodisplacive members is made of a material characterized in that it is crystallographically asymmetric, exhibits no hysteresis, and is formed at a temperature ranging from 200° C. to 300° C.

4. The array of claim 3, wherein the upper and the lower electrodisplacive members are made of zinc oxide or aluminum nitride.

5. The array of claim 4, wherein a polarization direction of the upper electrodisplacive member is identical to that of the lower electrodisplacive member in each of the thin film actuated mirrors.

6. A method for the manufacture of an array of M×N thin film actuated mirrors, wherein M and N are integers and each of the thin film actuated mirrors includes a light reflecting portion and an actuating portion, for use in an optical projection system, the method comprising the steps of:

providing an active matrix having a top surface, the active matrix including a substrate with an array of M×N transistors and an array of M×N connecting terminals;

forming a thin film sacrificial layer on the top surface of the active matrix;

removing portions of the thin film sacrificial layer formed around top of each of the connecting terminals in the active matrix;

forming a second thin film electrode layer on top of the thin film sacrificial layer and the top surface of the active matrix;

depositing a lower electrodisplacive layer on top of the second thin film electrode layer, wherein the lower electrodisplacive layer is made of a material characterized in that it is crystallographically asymmetric, exhibits no hysteresis, and is formed at a temperature ranging from 200° C. to 300° C.

forming an intermediate electrode layer on top of the lower electrodisplacive layer;

patterning the intermediate electrode layer in a columnar direction to produce M number of patterned intermediate electrode layers, wherein each of the patterned intermediate electrode layers is disconnected from each other and covers a portion of the lower electrodisplacive layer in such a way that the portion encompasses the connecting terminals in a same column;

depositing an upper electrodisplacive layer, made of the same material as that of the lower electrodisplacive layer, on top of the lower electrodisplacive layer with the patterned intermediate electrode layers located therebetween;

patterning the upper and the lower electrodisplacive layers in the columnar direction until the second thin film electrode layer is exposed to produce a patterned structure including M number of patterned layers and a corresponding number of exposed second thin film electrode layers to thereby define the actuating portion and the light reflecting portion in each of the thin film actuated mirrors, wherein each of the patterned layers corresponds to the actuating portion in each of the thin film actuated mirrors, is disconnected from each other by one of the exposed second thin film electrode layers and encompasses each of the patterned intermediate electrode layers, and each of the exposed second thin film electrode layers corresponds to the light reflecting portion in each of the thin film actuated mirrors;

forming a first thin film electrode layer made of an electrically conducting and light reflecting material on top of the patterned structure to produce a semifinished actuated structure;

patterning the semifinished actuated structure in a row direction, until the thin film sacrificial layer is exposed, into an array of M×N semifinished actuated mirrors, wherein each of the semifinished actuated mirrors includes a first thin film electrode, an upper electrodisplacive member, an intermediate electrode, a lower electrodisplacive member and a second thin film electrode; and removing the thin film sacrificial layer to thereby form an array of M×N thin film actuated mirrors.

7. The method of claim 6, wherein the thin film sacrificial layer is made of an oxide or a polymer.

8. The method of claim 6, wherein the thin film sacrificial layer is formed by using a sputtering or a vacuum evaporation method if the thin film sacrificial layer is made of the oxide, or a spin coating method if the thin film sacrificial layer is made of the polymer.

9. The method of claim 6, wherein the second thin film and the intermediate electrode layers are formed in a thickness of 0.1–2 μm.

10. The method of claim 9, wherein the second thin film and the intermediate electrode layers are formed by using a sputtering or a vacuum evaporation method.

11. The method of claim 6, wherein the upper and the lower electrodisplacive layers are formed by using a evaporation or a sputtering method.

12. The method of claim 11, wherein the upper and the lower electrodisplacive layers are formed in a thickness of 0.1–2 μm.

13. The method of claim 6, wherein the first thin film electrode layer is formed in a thickness of 500–2000Å.

14. The method of claim 13, wherein the first thin film electrode layer is formed by using a sputtering or a vacuum evaporation method.

15. The method of claim 6, wherein the upper and the lower electrodisplacive layers are patterned in the columnar direction in such a way that a layer of an electrodisplacive material is left on top of the second thin film electrode layer in the light reflecting portion.

* * * * *